(12) United States Patent
Hamilton

(10) Patent No.: US 9,830,666 B1
(45) Date of Patent: Nov. 28, 2017

(54) TRACKING INSURANCE FUNDS USING AN INTERPRETIVE REPRESENTATION OF ACCOUNTING INFORMATION

(71) Applicant: Guidewire Software, Inc., Foster City, CA (US)

(72) Inventor: Matthew Carl Hamilton, Pacifica, CA (US)

(73) Assignee: Guidewire Software, Inc., Foster City, CA (US)

(*) Notice: Subject to any disclaimer, the term of this patent is extended or adjusted under 35 U.S.C. 154(b) by 109 days.

(21) Appl. No.: 13/622,773

(22) Filed: Sep. 19, 2012

(51) Int. Cl.
*G07B 17/00* (2006.01)
*G07F 19/00* (2006.01)
*G06Q 40/00* (2012.01)

(52) U.S. Cl.
CPC .................................. *G06Q 40/10* (2013.01)

(58) Field of Classification Search
None
See application file for complete search history.

(56) References Cited

U.S. PATENT DOCUMENTS

| | | | |
|---|---|---|---|
| 6,366,929 B1* | 4/2002 | Dartigues et al. | |
| 7,212,982 B2* | 5/2007 | Daum | 705/5 |
| 8,117,096 B1* | 2/2012 | Thompson | 705/30 |
| 8,180,749 B1* | 5/2012 | Newlin | 707/705 |
| 8,230,455 B2* | 7/2012 | Hazlewood et al. | 725/5 |
| 2006/0161500 A1* | 7/2006 | Franzone | 705/43 |
| 2007/0203825 A1* | 8/2007 | Hanifin et al. | 705/38 |
| 2009/0019514 A1* | 1/2009 | Hazlewood et al. | 726/1 |
| 2009/0019533 A1* | 1/2009 | Hazlewood et al. | 726/5 |
| 2011/0191137 A1* | 8/2011 | Strange et al. | 705/7.23 |

* cited by examiner

*Primary Examiner* — Fateh M Obaid
(74) *Attorney, Agent, or Firm* — Van Pelt, Yi & James LLP

(57) ABSTRACT

A technique of tracking insurance funds using an interpretive representation of accounting information includes obtaining a plurality of accounting entities. It further includes deriving, based on the accounting entities, a plurality of funds-source entities and a plurality of funds-use entities. It further includes, in response to an allocation scheme, creating a set of tracking entities that allocate the funds-source entities to the funds-use entities, wherein each tracking entity connects one funds-source entity and one funds-use entity.

16 Claims, 9 Drawing Sheets

Payment for $1,000.00 Received on January 10, 2011

| | | |
|---|---|---|
| Policies Paid | 123701-03 (Auto) | 350.00 |
| | 123704-03 (Home) | 275.00 |
| | Subtotal | $625.00 |
| Transfers | To Account 234567 ($100.00) | 100.00 |
| | Subtotal | $100.00 |
| Disbursements | 01/23/2011 ($100.00) | 50.00 |
| | 02/02/2011 ($205.00) | 80.00 |
| | Subtotal | $130.00 |
| Write-offs (Negative) | 01/30/2011 ($12.00) | 8.00 |
| | Subtotal | $8.00 |
| Unallocated | | $137.00 |
| Total | | $1,000.00 |

FIG. 8

| Disbursement to Insured for $205.00 on 02/02/2011 | | 902 |
|---|---|---|
| Payments | 01/10/2011 ($1,000.00) | 80.00 |
| | 01/12/2011 ($500.00) | 35.00 |
| | Subtotal | $115.00 |
| Ad-Hoc Credits | 01/20/2011 ($15.00) | 15.00 |
| | 01/27/2011 ($5.00) | 5.00 |
| | Subtotal | $20.00 |
| Return Premium | From Policy 123704-03 ($120.00) | 50.00 |
| | Subtotal | $50.00 |
| Transfers | From Account 234568 ($40.00) | 20.00 |
| | Subtotal | $20.00 |
| Total | | $205.00 |

FIG. 9

TRACKING INSURANCE FUNDS USING AN INTERPRETIVE REPRESENTATION OF ACCOUNTING INFORMATION

BACKGROUND OF THE INVENTION

With traditional double entry accounting models, it can be difficult to understand the flow of funds through an accounting system, and explain how credits (e.g., payment, etc.) were used or debits (e.g., disbursements, etc.) were funded. This can be inconvenient, especially for insurance companies that sometimes must track the flow of funds for a large number of policies. In particular, sometimes there can be multiple policies for the same account. Currently, explaining how funds are applied to a customer typically requires the agent to manually examine the flow of funds, which is cumbersome and error-prone.

BRIEF DESCRIPTION OF THE DRAWINGS

Various embodiments of the invention are disclosed in the following detailed description and the accompanying drawings.

FIG. 8 is a diagram illustrating an example view of an interface showing a view of a source of funds.

FIG. 9 is a diagram illustrating an example view of an interface showing a view of a use of funds.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method for tracking insurance funds using an interpretive representation of accounting information is disclosed.

Figure 1:
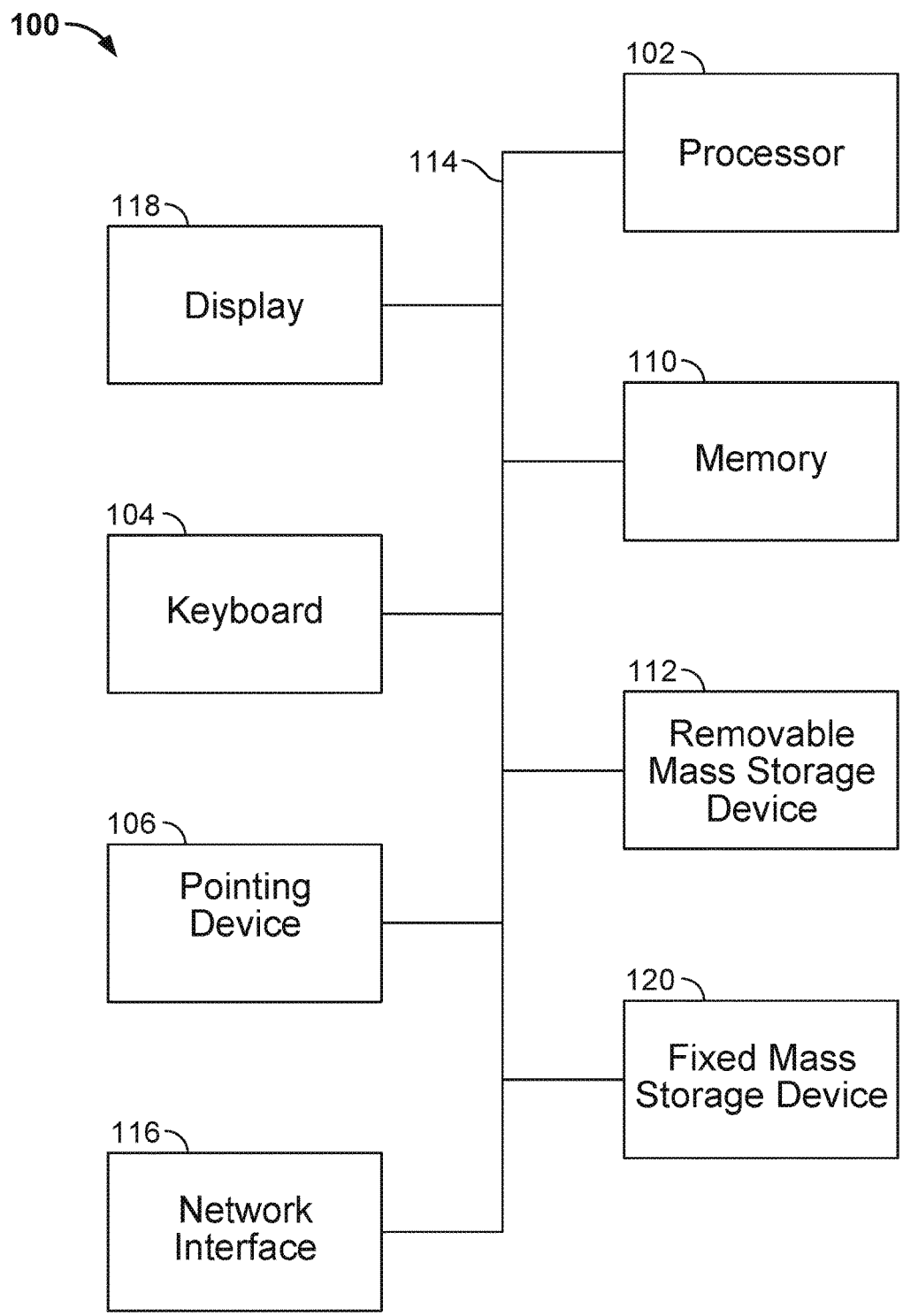
FIG. 1 is a functional diagram illustrating an embodiment of a programmed computer system for tracking funds using an interpretive representation of accounting information.

FIG. 1 is a functional diagram illustrating an embodiment of a programmed computer system for tracking funds using an interpretive representation of accounting information. As will be apparent, other computer system architectures and configurations can be used to perform funds tracking. Computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to track funds using an interpretive representation of accounting information.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media described below, depending on whether, for example, data access needs to be bi-directional or unidirectional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer-readable medium is any data storage device that can store data which can thereafter be read by a computer system. Examples of non-transitory computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
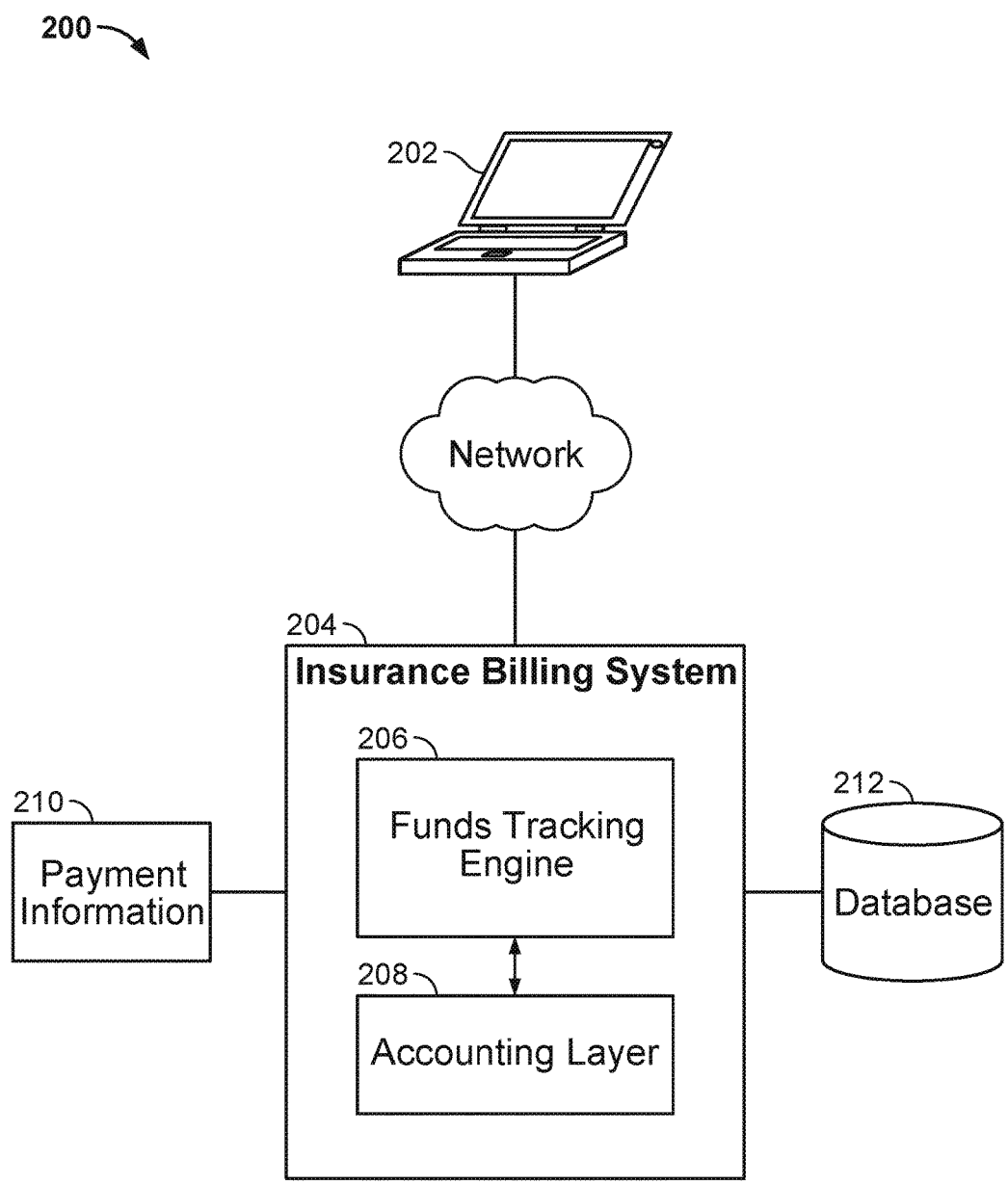
FIG. 2 is a system diagram illustrating an embodiment of a system for tracking insurance funds using an interpretive representation of accounting information.

FIG. 2 is a system diagram illustrating an embodiment of a system for tracking insurance funds using an interpretive representation of accounting information. In this example, a client device 202 communicates with insurance billing system 204 via a network. Examples of device 202 include a laptop computer, a desktop computer, a smart phone, a mobile device, a tablet device or any other appropriate computing device. Examples of users of client device 202 include insurance policy holders, insurance policy producers (e.g., insurance agents, brokers), billing representatives, etc. As shown, device 202 is configured to communicate with insurance billing system 204, which includes funds tracking engine 206 and accounting layer 208. In various embodiments, an application such as a web browser or a client application is installed at device 202 to enable communication with the billing system. In this example, insurance billing system 204 has logic for handling payment information 210 (e.g., receiving information associated with posted credits, debits, transactions, etc.), allocating and tracking insurance funds using an interpretive representation of accounting information obtained from accounting layer 208, archiving historical funds tracking information in database 212, etc. Other configurations of system 200 are possible.

FIG. 3A is a block diagram illustrating an embodiment of a funds tracking engine. In some embodiments, funds tracking engine 300 is an example of funds tracking engine 206 of FIG. 2. In the example shown, funds tracking engine 300 includes funds tracking entity generation engine 302, allocation engine 304, and reporting engine 306.

Funds tracking entity generation engine 302 is configured to generate entities and/or objects used for funds tracking. In various embodiments, funds tracking entities include funds-sources (308), tracking entities (310), and funds-uses (312).

In some embodiments, funds-source (308) and funds-use (312) entities include credits and debits, respectively, that are derived from interpretive representations of accounting information and/or objects (e.g., obtained from accounting layer 208 of FIG. 2). In some embodiments, a funds-source entity can be the opposite of a debit (e.g., debit reversal). In some embodiments, a funds-use entity can be a credit reversal. The funds-uses and sources can be of particular amounts. In some embodiments, an obtained accounting entity associated with a credit is identified as a candidate source of funds, and in response to the identification, a new funds-source entity that is derived from the credit (or opposite of debit) accounting object is created. Similarly, in some embodiments, a new funds-use entity can be created that is derived from a debit accounting object that has been identified as a candidate use of funds. The derived funds tracking entities can then be maintained independently from underlying account information and used for funds tracking without affecting other features of an insurance billing system (e.g., accounting). In various embodiments, funds tracking entities include information associated with the date that the accounting objects from which they were derived were posted as well as account numbers from which payments were transferred in or out (e.g., source), as well as any other appropriate tracking information.

In various embodiments, funds-sources indicate where funds come from. Examples of funds-sources include payments, ad-hoc credits, inbound transfers, return premiums, funds-use reversals, etc. In various embodiments, funds-uses indicate how funds are used. Examples of funds-uses include payment item lists, premiums applied to policies (or account-level charges), disbursements, outbound transfers, negative write-offs, funds-source reversals, etc.

Allocation engine (304) is configured to allocate funds-source entities to funds-use entities. A determination of which funds-source entities (e.g., from a pool of established candidate funds-source entities) should be applied against a funds-use, as well as the portion of a given funds-source entity that should be applied can be determined by an allocation technique. The allocation techniques can be based on rules, heuristics, instructions, etc. In some embodiments, a funds-source can be applied against one or more funds-uses. For example, given a $100 payment funds-source, $75 of the funds-source can be applied against an automobile premium, while $20 of the funds-source can be applied to a disbursement (with $5 remaining unallocated). Similarly, a funds-use can be funded by one or more funds-sources. For example, given a $205 disbursement, $100 of the disbursement may be provided by a payment funds-source, while the remaining $105 may be funded by a return premium funds-source. This can result in a many-to-many mapping of funds-sources and funds-uses.

In response to the allocation, a tracking entity (310) is created for each connection between a funds-source and a related funds-use. In some embodiments, each tracking entity connects one funds-source entity and one funds-use entity. The tracking entities can include details and information of the mappings between funds-sources and funds-uses. In various embodiments, a tracking entity indicates, for a given funds-source, the funds-use to which the funds-source was allocated, the amount of the funds-source allocated, the date of the allocation, account information (e.g., line of business, policy account number) of the allocation, etc. In the example of the $100 payment funds-source above, a first tracking entity indicating that $75 of the funds-source was applied to an automobile premium on May $5^{th}$, and a second tracking entity indicating that $20 of the funds-source was applied to a disbursement on July $7^{th}$ can be created to provide information associated with the allocations.

Reporting engine 306 is configured to output funds tracking reports. In some embodiments, a report is provided and/or displayed to a user indicating, based on information from tracking entities, details associated with the allocation of funds-sources to funds-uses. Examples of presented reports are described in more detail below.

FIG. 3B is a block diagram illustrating an embodiment of an accounting layer. In some embodiments, accounting layer 350 is an example of accounting layer 208 of FIG. 2. In some embodiments, accounting layer 350 includes accounting model 352 (e.g., a double entry accounting model) and accounting information 354. Accounting information 354 includes accounting objects associated with accounting model 352, such as credit (356) and debit (358) accounting entities as well as payment items (360). In some embodiments, accounting objects included in accounting information 354 include representations of double entry accounting model information.

In some embodiments, payment items (360) include underlying account level information associated with fulfilled transactions/charges (e.g., payment of a premium charge, return premium, etc.). In some embodiments, a payment item includes information pertaining to an act of paying a positive item or drawing down from a negative item.

In the example shown, although accounting layer 350 and funds tracking engine 300 are configured for bilateral communication, accounting layer 350 can be an operational layer that is separate, disjoint, or otherwise decoupled from the layer on which funds tracking engine 300 resides. This includes a separation between funds tracking engine 300 and the underlying accounting information 354. Maintaining the account engine and funds tracking engine separately and/or independently allows the funds tracking engine to be implemented as a configurable plugin that operates independently from the accounting layer and other features of an insurance billing system. In this way, the functionality of a core static accounting layer is not affected when performing tracking of insurance funds, preventing the need for modification (e.g., recoding) of, or dependency on, the underlying accounting layer to be compatible with a particular allocation mechanism, as well as preventing corruption of accounting information. Funds tracking can also be decoupled from other features/functionality of an insurance billing system so that other features are not dependent on funds tracking. For example, funds tracking can be turned on or off as desired without affecting functionality of the accounting layer or other features of an insurance billing system.

Figure 3:
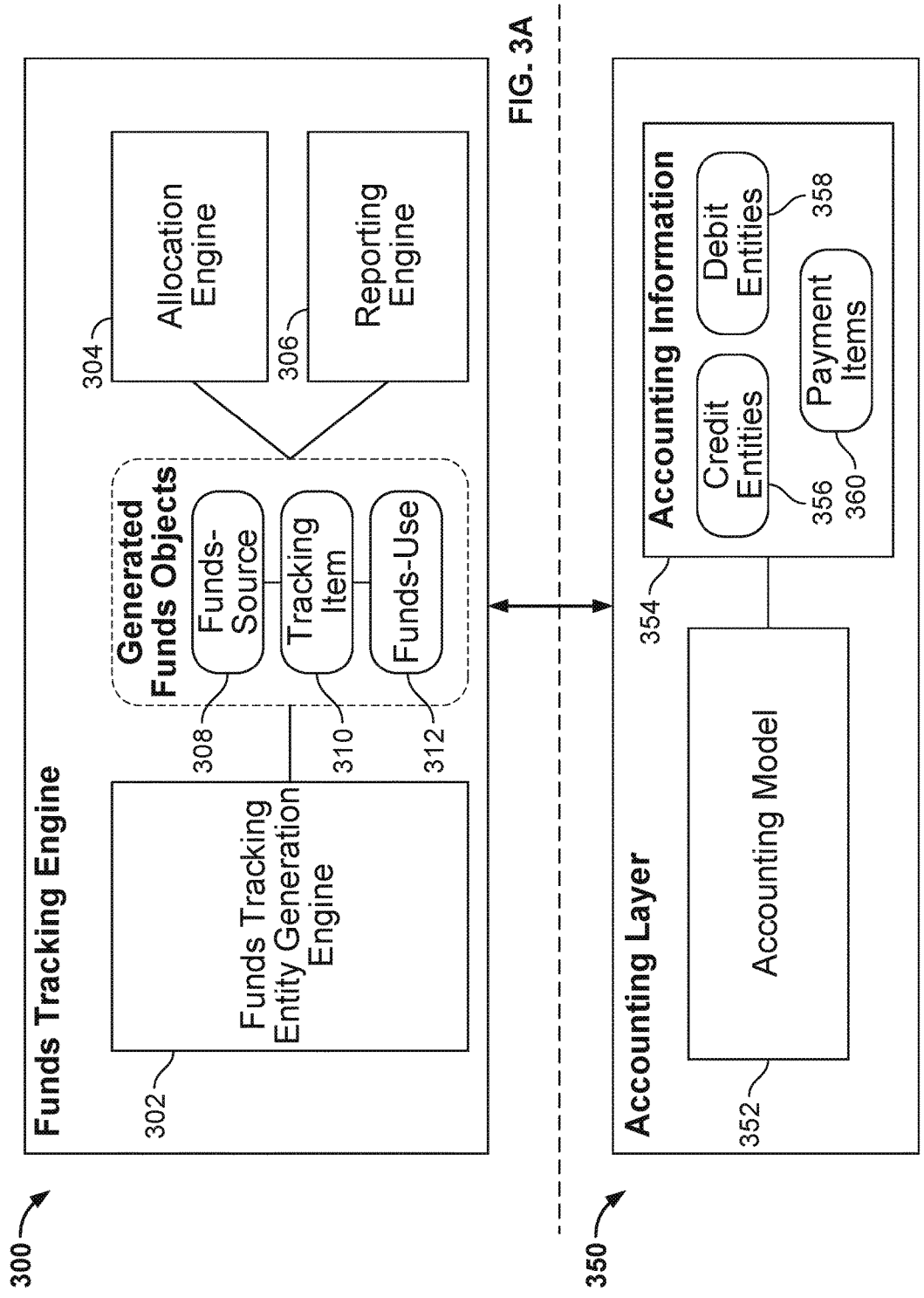
FIG. 3A is a block diagram illustrating an embodiment of a funds tracking engine.
FIG. 3B is a block diagram illustrating an embodiment of an accounting layer.
Figure 4:
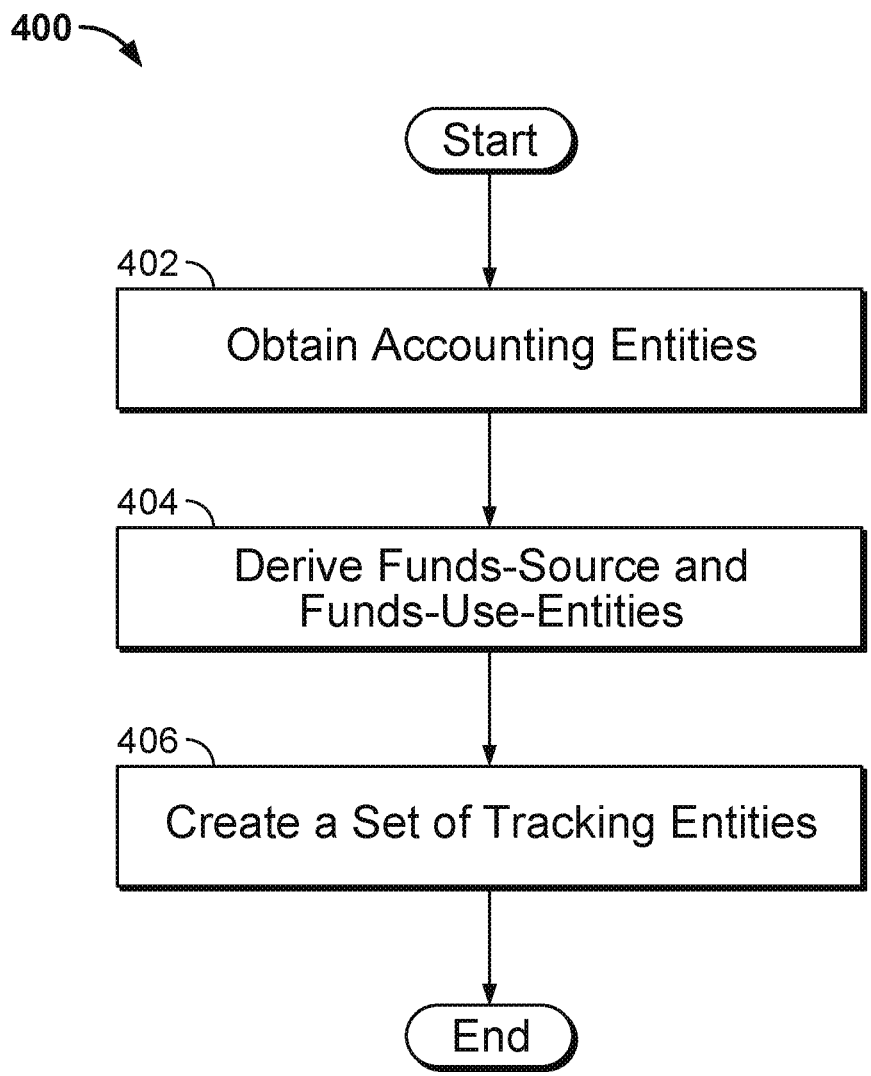
FIG. 4 is a flow diagram illustrating an embodiment of a process for tracking insurance funds using an interpretive representation of accounting information.

FIG. 4 is a flow diagram illustrating an embodiment of a process for tracking insurance funds using an interpretive representation of accounting information. In some embodiments, process 400 of FIG. 4 is executed by funds tracking engine 206 of FIG. 2. The process begins at 402 when accounting entities are obtained. The accounting entities can be obtained with respect to a particular account. Examples of obtained accounting information objects include accounting information 354 (e.g., credit entities, debit entities, payment items, etc.) obtained from accounting layer 350 of FIG. 3. In some embodiments, accounting entities are obtained on a time-driven basis. For example, accounting information associated with an account can be evaluated periodically to determine whether any new credit or debit accounting objects or payment items have been posted. The new accounting entities can then be obtained. In some embodiments, accounting entities are obtained in response to or otherwise triggered upon receiving an indication that new credit and/or debit accounting entities (or any new payment items or other accounting information) have been posted and/or created.

At 404, funds-sources and funds-uses are derived based on the obtained accounting entities. In some embodiments, obtained accounting entities are evaluated to identify, classify, or otherwise determine whether an obtained accounting entity would result in a use of funds or a source of funds. Funds-source and funds-use entities can then be derived from the obtained accounting entities based on the determination/identification/classification.

As described above, funds-sources and funds-uses can be derived representations of accounting information, with funds-sources including representations of payments, ad-hoc credits, inbound transfers, return premiums, funds-use reversals, etc., and funds-uses including representations of payment item lists, premiums applied to policies (or account-level charges), disbursements, outbound transfers, negative write-offs, funds-source reversals, etc.

In some embodiments, funds-sources and funds-uses can be derived from payment items (e.g., payment items 360 of FIG. 3). The amount charged in a payment can be positive or negative. In some embodiments, payment items are identified as funds-sources or funds-uses based on the sign of the amount charged in the payment transaction. For example, if a payment item included the payment of a $300 premium charge, then the $300 premium charge is considered a positive charge to a policy holder and is identified as a use of funds and a corresponding funds-use entity is created. As another example, if a payment item included a return premium charge of $500 (e.g., driver has qualified as a good student and their premium has been reduced, so a portion of a premium that was paid in advance is returned to the policy holder), the charge would be a −$500 charge to the policy holder (e.g., credit to be applied to the policy holder), and because the sign of the charge is negative, the −$500 charge would be identified as a source of funds, and a corresponding funds-source entity is created.

In some embodiments, payment items can be grouped into a payment item set or list. In the example above, the two different payment items resulted in the creation of two different funds tracking entities, one a funds-source of $500, and another a funds-use of $300. However, the payment items can be grouped together, with the sign of the net charge of the payment item set used to identify the total payment item set as a source or use of funds. For example, combined and in totality, the two payment items result in a net charge −$200, thereby resulting in the creation of a single funds-source entity. A payments item list can also be handled and split in various manners. For example, in some embodiments, groups of payment items being paid (or reversed) are not split (e.g., all payment items for one payment or reversal comprise one funds-source or funds-use). As another example, the payment item set can be split up by policy. For example, if a single payment is applied against more than one policy, this use (or source) can be split and tracked separately by policy. In some embodiments, the groups of items included in a payment item set are split by type. For example, a normal premium can be split out to become a funds-use, while a return premium will then become a funds-source. Any number of splits can come from any payment. Default splitting rules can be applied.

In some embodiments, payments such as recapture charges (e.g., to negate a shortfall due to mistaken disbursement) are not included in a payment items set and are handled and/or reversed separately, as associated funds remain available. In some embodiments, a recapture charge is a special type of charge that appears on an invoice to prompt/request the insured to add funds to an account (e.g., add cash to the account to make up a cash shortfall). However, in some embodiments, the recapture charge is not treated as a funds-use, and does not consume any funds added to the account. Instead, in some embodiments, added funds are treated as a funds-source. At 406, in response to an allocation scheme, a set of tracking entities that allocate the funds-source entities to the funds-use entities is created. In some embodiments, the allocation scheme determines, from a set of established candidate funds-source entities, appropriate funds-sources to apply against a funds-use, as well as the amount of each funds-source to apply. In various embodiments, the allocation scheme is based on rules, heuristics, instructions, etc. Example heuristics include first-in-first-out (FIFO) and heuristics based on fractions/proportions. For example, based on a FIFO heuristic, an allocation scheme can select funds-sources to apply against funds-uses based on the order with which they were derived (e.g., earliest unallocated derived funds-source should be applied first). If a proportional/fractional heuristic were used, then an allocation algorithm could take a fixed fraction or percentage from each available funds-source to allocate to funds-uses.

In some embodiments, an allocation scheme is based on configurable rules that can be used to control and/or decide the allocation of particular funds-sources for funds-uses. In some embodiments, rules include conditions on how particular funds-sources can be applied against particular funds-uses. For example, a rule can indicate that a specific line of credit may only be applied against a particular layer of losses or, for example, that a return premium cannot be used to pay late fees. Additionally, spending profile patterns can be created indicating one or more rules on how particular sources may be allocated. In some embodiments, allocation rules include default rules.

In some embodiments, the allocation of funds-sources to funds-uses is based on instructions. The instructions can be received from policy holders via, for example, a user interface. As an example, a policy holder may provide explicit instructions indicating how any excess unallocated funds should be allocated. In some embodiments, the instructions provided by a user can override an allocation scheme that is currently in place.

In some embodiments, allocation schemes are applied based on account specific logic. For example, two different allocation schemes can be used for two different accounts based on their type (e.g., for national account use FIFO, for a different account, use a different scheme). As another example, different allocation schemes can be utilized based on the line of business for an account.

In some embodiments, tracking items are allocated based on information associated with the distribution of credits in the underlying accounting layer. In some embodiments, the allocation of tracking items is aligned with the core transactional accounting model.

In some embodiments, funds tracking data can be reversed (e.g., tracking items discarded) and reallocation performed. An example scenario in which funds tracking data can be reversed is in the case of a reversal. For example, if a disbursement (funds-use) that was paid for by a particular funds-source was sent out to a policy holder, but the policy holder did not cash the disbursement check, the disbursement can be reversed by identifying the tracking item used to map the particular funds-source allocated to the disbursement funds-use and discarding/erasing the tracking item. The funds-source can then be reallocated to other funds-uses. In some embodiments, the reversal can also be managed by generating an opposite funds tracking entity (i.e., reversal of a funds-source results in a new funds-use). For example, a new credit funds-source of the same amount of the disbursement can be created to counter the disbursement that was paid out (with the original disbursement tracking data still being maintained).

In some embodiments, the creation of tracking entities is performed on a time-driven basis (e.g., periodically) or is triggered based on an event (e.g., new funds-use identified/posted). In some embodiments, the creation of tracking entities is performed as a batch process or in a batch driven manner, where multiple funds-sources and uses are evaluated concurrently by an allocation algorithm. The batch creation of funds tracking entities can be performed serially (e.g., one at a time) or in parallel (e.g., uses of funds are evaluated in context of other funds-uses).

As the funds tracking layer operates independently of other features of a billing insurance system (e.g., by maintaining funds entities that are interpretive representations of underlying accounting information independently and/or separately from the underlying accounting information and not having the funds entities used by other features), tracking data can be discarded and recreated (e.g., using a same allocation scheme), or reallocation can be performed (e.g., by applying a new allocation scheme) without affecting other features such as a core accounting system and associated accounting information. For example, core accounting data can remain persistent, while associated tracking data can be modified or purged, with the persistent accounting data used to rebuild tracking information (e.g., with a new allocation scheme).

In some embodiments, various forms of payments and payment items are tracked, not tracked, or optionally tracked. For example, in some embodiments, movements to and from collateral may optionally be tracked or ignored for funds tracking purposes. In some embodiments, collateral is included as a separate pool of funds that is allocated to a given account but is not subject to transactional activity (other than to release it back to the given account).

In some embodiments, suspense payment items are not tracked. In some embodiments, suspense items are entities that represent a portion of a payment to be set aside for payment of specific receivables expected to be posted in the future. In some embodiments, suspense payment items include payment items that are not allocated from the perspective of the accounting layer because they are currently being held and will be released and applied at a future point in time. In some embodiments, the allocation scheme receives an indication of payment items as suspense payment items and does not allocate the items.

In some embodiments, suspense payments are not tracked until they are applied to an account. In some embodiments, a suspense payment is a payment that is suspended from being a potential funds-source for an account because it has not been associated with an account. In some embodiments, a suspense payment is a payment that is not applied to an account, for example, because it is not associated with sufficient information to identify the account to which it should be applied. An example of a suspense payment is a payment that was received in the form of a check, but because the account to which the payment is associated with cannot be identified (e.g., due to illegibility of the handwriting), the use of the payment as a funds-source is suspended.

In some embodiments, funds tracking information is presented (e.g., displayed to a user). For example, for a given funds-source entity, its related funds-use entities and its associated tracking entities can be presented. Similarly, for a given funds-use entity, its related funds-source entities, and its associated tracking entities can be provided. In some embodiments, funds tracking can be presented to a user in the form of a report. The report can include multiple line items related to a funds-use (source) with information obtained from associated tracking entities. In various embodiments, funds-source (use), related uses (sources), and associated tracking entity information can be provided in the form of a pie chart, histogram, or any other appropriate report. In some embodiments, a visual representation of the many-to-many joins and mappings between funds tracking entities can be provided. Example reports and visualizations are provided below.

Figure 5:
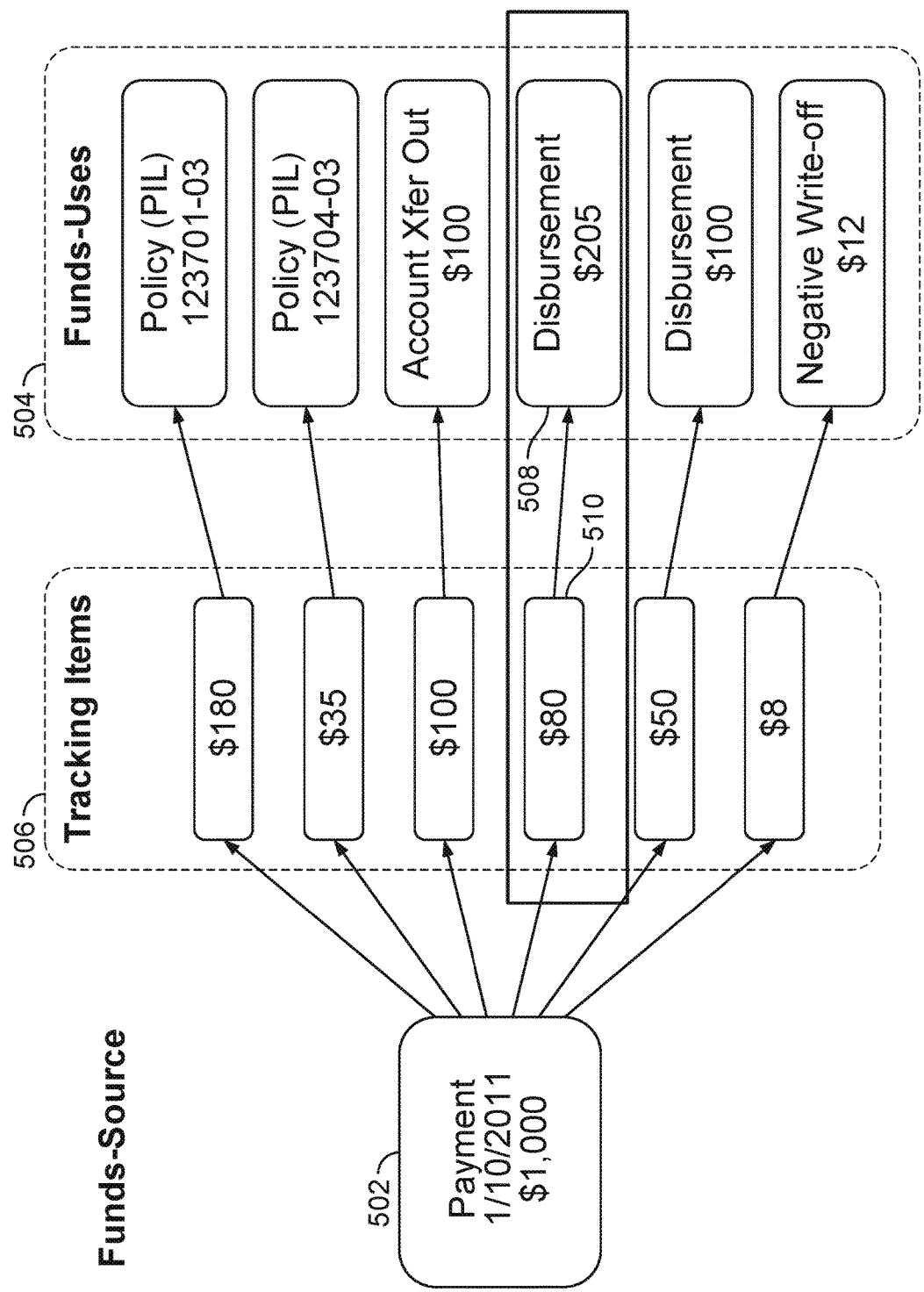
FIG. 5 is a diagram illustrating an example of tracking information associated with a funds-source.

FIG. 5 is a diagram illustrating an example of tracking information associated with a funds-source. In some embodiments, the tracking information is generated via a process such as, for example, step 406 of FIG. 4. In this example, a $1000 payment funds-source (502), the related funds-uses that it has been applied against (504), and associated mapping tracking items (506) are shown. In the example shown, one of the funds-uses that funds-source 502 has been applied against is a $205 disbursement (508). $80 of funds-source 502 has been allocated to disbursement 508, as shown in tracking item 510. In the example shown, the funds-source has been partially allocated (e.g., not all $1000 has been allocated), and the tracking items associated with the allocated portions of the funds-source are shown. In this example, $453 of the $1000 funds-source has been allocated (with associated tracking information 506), while $547 remains unallocated. The tracking items show the amount of funds taken from payment funds-source 502 that have been applied to a particular funds-use. Other information, such as the date of the allocation can also be shown.

Figure 6:
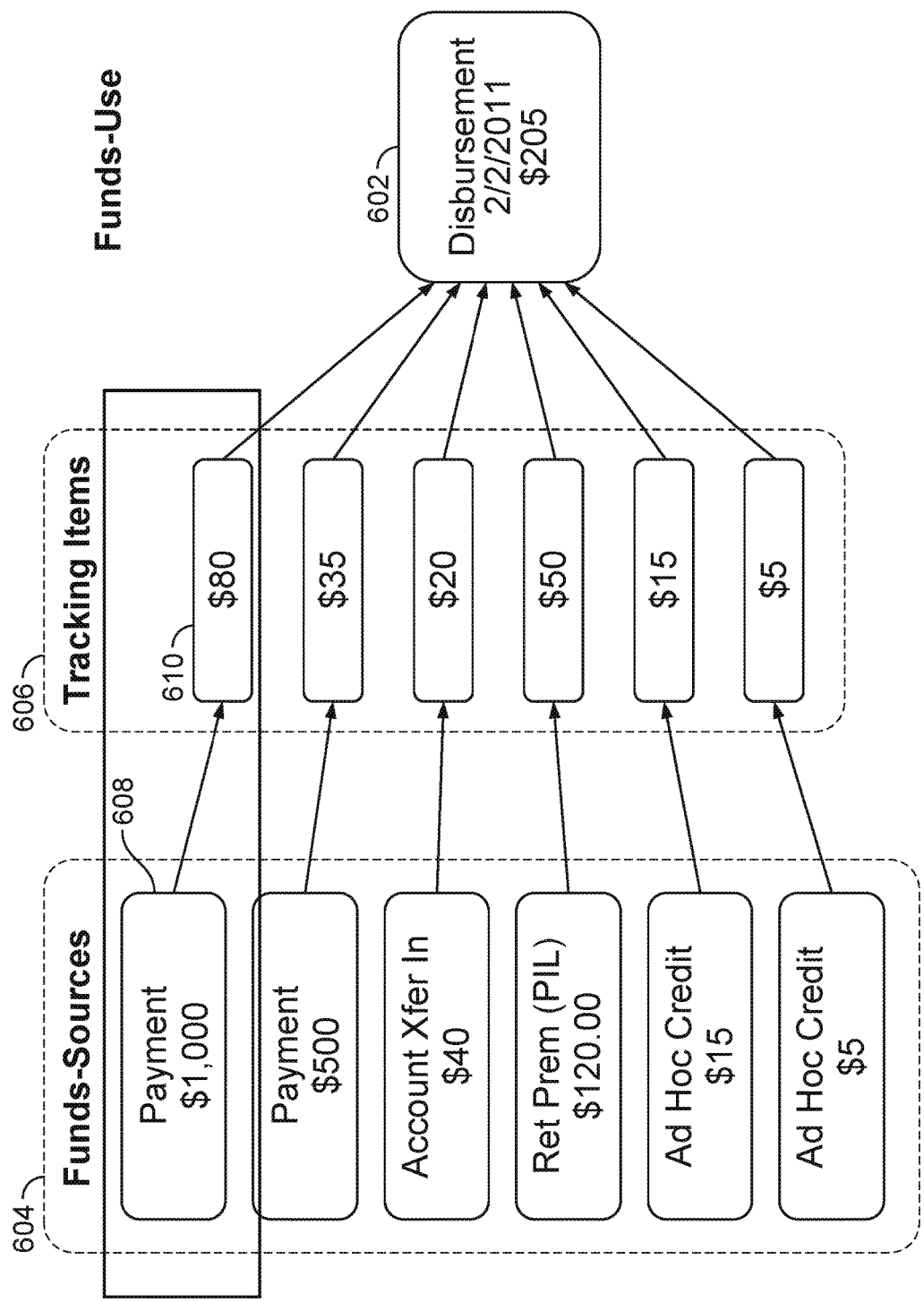
FIG. 6 is a diagram illustrating an example of tracking information associated with a funds-use.

FIG. 6 is a diagram illustrating an example of tracking information associated with a funds-use. In some embodiments, the tracking information is generated via a process such as, for example, step 406 of FIG. 4. In this example, a $205 disbursement funds-use (602), the related funds-sources that are allocated to it (604), and associated mapping tracking items (606) are shown. In the example shown, funds-use 602 corresponds to disbursement 508 of FIG. 5, $1000 payment funds-source 608 corresponds to payment funds-source 502 of FIG. 5, and tracking item 610 corresponds to tracking item 510 of FIG. 5. Portions from multiple fund sources 604 flow into the disbursement and are tracked by tracking items 606. In this example, only fund sources and tracking items relating to disbursement 602 are shown while other unrelated fund sources and tracking items are omitted.

Figure 7:
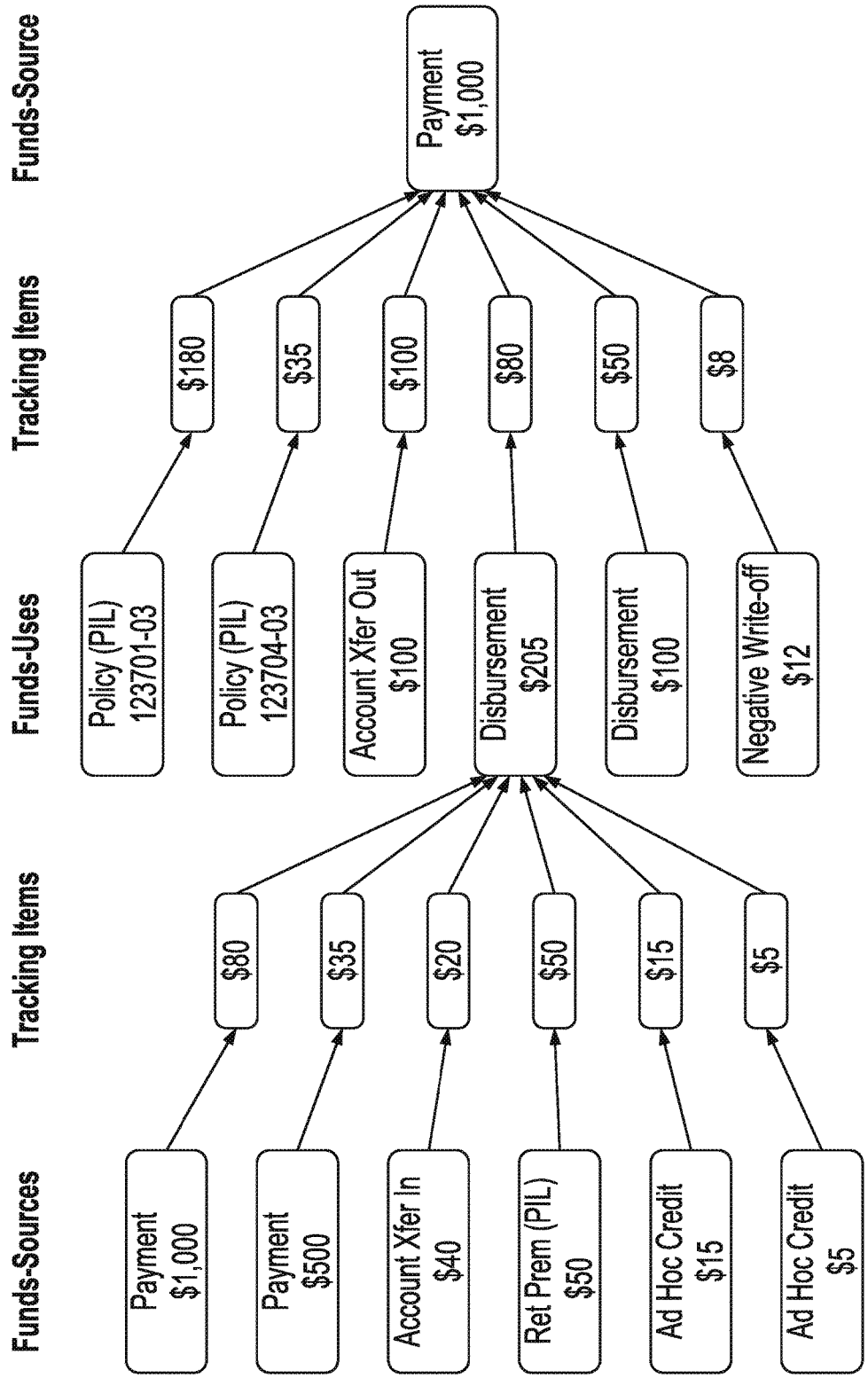
FIG. 7 is a diagram illustrating an example of funds tracking information.

FIG. 7 is a diagram illustrating an example of funds tracking information. In some embodiments, the tracking information is generated via a process such as, for example, step 406 of FIG. 4. In the example shown, a combination of the funds-uses and funds-sources of FIG. 5 and FIG. 6 is shown. Funds tracking data is contained within a single account. Each funds-use (e.g., the disbursement of $205) has a corresponding set of tracking items that map to the funds-sources that supply the funds for the funds-use; each funds-source (e.g., the payment of $1000) also has a corresponding set of tracking items that map to the funds-uses to which the funds-source is applied. Based on the mapping information, it is possible to determine and view how a funds-source is applied to various funds-uses, and how a funds-use gets its funds from various funds-sources. For example, the tracking items can be used to trace the path of allocation of portions of funds-sources to funds-uses, and funds-uses back to the funds-sources used to fund them.

FIG. 8 is a diagram illustrating an example view of an interface showing a view of a source of funds. In this example, a view of a funds-source ($1000 payment received on Jan. 10, 2011) is shown. Related funds-uses that portions of the funds-source were applied against are also displayed. The funds-uses can be organized by type (e.g., by policies, transfers, disbursements, write-offs (negative), etc.). Information associated with each allocation can be provided via a corresponding funds tracking entity, indicating the date that the funds-use was posted, the total value of the funds-use, as well as the amount from the funds-source that was allocated to the total value of the funds-use. Subtotals of the contributions/allocations to each of the different types of funds-uses can also be displayed. The amount of remaining unallocated funds can also be displayed. In this example, the information reported/displayed corresponds to information shown in the example of FIG. 6. For example, line item 802 represents the allocation of $80 to a funds-use disbursement posted Feb. 2, 2011 and corresponds to disbursement 608 and tracking item 610 of FIG. 6. In some embodiments, the line items are linked to other views of funds-uses (and vice versa). The links can be automatically determined based on information associated with the associated funds tracking entities. For example, a user can select line item 802 and in response to the selection, be presented with a detailed view of the $205 disbursement, which will be shown in further detail in FIG. 9.

FIG. 9 is a diagram illustrating an example view of an interface showing a use of funds. In this example, a view of a funds-use ($205 disbursement to the insured on Feb. 2, 2011) is shown. In the example shown, the line items displayed correspond to the example funds tracking entities shown in FIG. 6. In this example, line item 902 corresponds to the $1000 funds-source described in FIG. 8. In some embodiments, a link can be associated with line items (e.g., line item 902) such that when selected (e.g., clicked on), the user is presented with the detailed interface view of a funds-source (e.g., funds-source view of FIG. 8).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   receive, from a data store, a plurality of accounting entities;
   derive, based on the accounting entities:
   a plurality of funds-source entities comprising representations of sources of funds to be allocated; and
   a plurality of funds-use entities comprising representations of uses for which at least a portion of the funds are to be allocated;
   allocate, according to an allocation scheme, at least one of the funds-source entities against at least one of the funds-use entities;
   in response to the allocation, generate, for each allocation of a funds-source entity to a funds-use entity, a tracking entity that maintains information associated with the allocation between the funds-source entity and the funds-use entity;
   display, in a user interface and based at least in part on the generated tracking entity, a visual representation of how the funds-source entity was allocated against the funds-use entity;
   wherein the user interface includes a link to a view of at least one of the funds-source entity and the funds-use entity, and wherein the link to the view is automatically determined based at least in part on the generated tracking entity; and
   in response to a user selection of the link, present, in the user interface, the view of the at least one of the funds-source entity and the funds-use entity; and
   a memory coupled to the one or more processors and configured to provide the one or more processors with instructions.

2. The system of claim 1, wherein the one or more processors are further configured to receive a use of funds request for an account.

3. The system of claim 2 wherein the one or more processors are further configured to identify funds-sources and funds-uses for the account.

4. The system of claim 1 wherein the funds-use entity comprises a representation of a debit.

5. The system of claim 1 wherein the funds-source entity comprises a representation of a credit.

6. The system of claim 1 wherein the funds-use entity comprises a representation of a credit reversal.

7. The system of claim 1 wherein the allocation scheme is based on a heuristic.

8. The system of claim 1 wherein the allocation scheme is based on a rule.

9. The system of claim 1 wherein the allocation scheme is based on an instruction received from a user.

10. The system of claim 1, wherein the tracking entity includes allocation information.

11. The system of claim 10, wherein the allocation information includes a date of allocation.

12. The system of claim 10, wherein the allocation information includes an amount of allocation.

13. A method, comprising:
   receiving a plurality of accounting entities from a data store;
   deriving, using one or more processors and based at least in part on the accounting entities:
   a plurality of funds-source entities comprising representations of sources of funds to be allocated; and
   a plurality of funds-use entities comprising representations of uses for which at least a portion of the funds are to be allocated;
   allocating, according to an allocation scheme, at least one of the funds-source entities against at least one of the funds-use entities;
   in response to the allocation, generating, for each allocation of a funds-source entity to a funds-use entity, a tracking entity that maintains information associated with the allocation between the funds-source entity and the funds-use entity;
   displaying, in a user interface and based at least in part on the generated tracking entity, a visual representation of how the funds-source entity was allocated against the funds-use entity;
   wherein the user interface includes a link to a view of at least one of the funds-source entity and the funds-use entity, and wherein the link to the view is automatically determined based at least in part on the generated tracking entity; and
   in response to a user selection of the link, presenting, in the user interface, the view of the at least one of the funds-source entity and the funds-use entity.

14. The method of claim 13, further comprising receiving a use of funds request for an account.

15. The method of claim 14, further comprising identifying funds-sources and funds-uses for the account.

16. A computer program embodied in a non-transitory tangible computer readable storage medium and comprising computer instructions for:
   receiving a plurality of accounting entities from a data store;
   deriving, using one or more processors and based on the accounting entities:
   a plurality of funds-source entities comprising representations of sources of funds to be allocated; and
   a plurality of funds-use entities comprising representations of uses for which at least a portion of the funds are to be allocated; and
   allocating, according to an allocation scheme, at least one of the funds-source entities against at least one of the funds-use entities;
   in response to the allocation generating, for each allocation of a funds-source entity to a funds-use entity, a tracking entity that maintains information associated with the allocation between the funds-source entity and the funds-use entity; and displaying, in a user interface and based at least in part on the generated tracking entity, a visual representation of how the funds-source entity was allocated against the funds-use entity;

wherein the user interface includes a link to a view of at least one of the funds-source entity and the funds-use entity, and wherein the link to the view is automatically determined based at least in part on the generated tracking entity; and in response to a user selection of the link, presenting, in the user interface, the view of the at least one of the funds-source entity and the funds-use entity.

\* \* \* \* \*